(12) United States Patent
Murthy

(10) Patent No.: US 12,457,194 B2
(45) Date of Patent: *Oct. 28, 2025

(54) SYSTEMS AND METHODS FOR MOVING NETWORK CONTAINERS IN A COMPUTER NETWORK

(71) Applicant: PAYPAL, INC., San Jose, CA (US)

(72) Inventor: Sharad Murthy, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,700

(22) Filed: Dec. 30, 2022

(65) Prior Publication Data

US 2023/0224273 A1    Jul. 13, 2023

Related U.S. Application Data

(63) Continuation of application No. 17/490,715, filed on Sep. 30, 2021, now Pat. No. 11,546,294, which is a continuation of application No. 15/639,883, filed on Jun. 30, 2017, now Pat. No. 11,146,530.

(60) Provisional application No. 62/361,971, filed on Jul. 13, 2016.

(51) Int. Cl.
| | | |
|---|---|---|
| *H04L 61/5084* | (2022.01) | |
| *H04L 61/5007* | (2022.01) | |
| *H04L 61/5061* | (2022.01) | |

(52) U.S. Cl.
CPC ...... *H04L 61/5084* (2022.05); *H04L 61/5007* (2022.05); *H04L 61/5061* (2022.05)

(58) Field of Classification Search
CPC .......... G06F 2009/4557; G06F 11/203; G06F 9/4856; G06F 3/0647; H04L 61/5084
See application file for complete search history.

(56) References Cited

U.S. PATENT DOCUMENTS

| | | | |
|---|---|---|---|
| 10,205,701 B1 | 2/2019 | Voss et al. | |
| 10,228,959 B1 * | 3/2019 | Anderson | G06F 9/546 |
| 2009/0068982 A1 * | 3/2009 | Chen | G06Q 20/4015 |
| | | | 455/407 |
| 2010/0205304 A1 | 8/2010 | Chaturvedi et al. | |

(Continued)

OTHER PUBLICATIONS

S. Choi, V. Sarangan, J. Thomas and S. Radhakrishnan, "Secure access control protocol for WSNs with inter-network roaming," IEEE Local Computer Network Conference, Denver, CO, USA, 2010, pp. 256-259 (Year: 2010).*

(Continued)

*Primary Examiner* — Messeret F Gebre
(74) *Attorney, Agent, or Firm* — Haynes and Boone, LLP

(57) ABSTRACT

The systems and methods that maintain an IP address of a container when the container is moved from a first node to a second node in a data center are provided. Each node includes a local controller which is communicatively coupled to the central controller. The local controller generates an IP address for a container that executes on the first node. A label unique to the container is also generated on the first node. The local controller then synchronizes the IP address and the label of the container with the central controller. The central controller then passes the IP address and the label to the second node when the container is moved from the first node to the second node, and ensures that the IP address of the container remains the same before and after the move.

20 Claims, 8 Drawing Sheets

(56) References Cited

U.S. PATENT DOCUMENTS

| | | | |
|---|---|---|---|
| 2014/0075432 | A1 | 3/2014 | McGrath et al. |
| 2014/0195687 | A1* | 7/2014 | Rewaskar ........... H04L 61/4511 |
| | | | 709/226 |
| 2014/0229944 | A1 | 8/2014 | Wang et al. |
| 2015/0058968 | A1 | 2/2015 | Wang et al. |
| 2015/0200912 | A1 | 7/2015 | Wang et al. |
| 2015/0312097 | A1 | 10/2015 | Riewrangboonya et al. |
| 2016/0065531 | A1* | 3/2016 | Xiaopu .................. H04L 45/74 |
| | | | 709/238 |
| 2017/0005923 | A1 | 1/2017 | Babakian |
| 2017/0126469 | A1* | 5/2017 | Liang .................... H04L 41/042 |

OTHER PUBLICATIONS

D. S. Kim, M. Ito, S. Komorita, Y. Kitatsuji and H. Yokota, "Design and Implementation of a Network Management System for Service Oriented Network," 2012 World Telecommunications Congress, Miyazaki, Japan, 2012, pp. 1-6. (Year: 2012).*

Elsaleh T., et al., "Service Continuity for Subscribers of the Mobile Real World Internet," 2011 IEEE International Conference on Communications Workshops (ICC), 2011, pp. 1-5.

Ghiani G., et al., "Evaluating Context-Aware User Interface Migration in Multi-Device Environments," Journal of Ambient Intelligence and Humanized Computing, 2015, vol. 6, No. 2, pp. 259-277.

Hu J.J., et al., "Thermal Management and Load Control of Container Data Center: A Case Study of Cloud Computing in a Rack," International Symposium on Computer, Consumer and Control, 2012, 4 pages.

Isomura M., et al., "Extension of Service Migration Method for Video on Demand Service," 2010 Ninth International Conference on Networks, 2010, pp. 350-355.

Masky M., et al., "A Novel Risk Identification Framework for Cloud Computing Security," 2nd International Conference on Information Science and Security (ICISS), 2015, 4 pages.

Milanes A., et al., "A Classification for the Implementations of Heterogeneous Strong Migration of Computations," Seventh IEEE International Symposium on Cluster Computing and the Grid (CCGrid '07), 2007, pp. 858-868.

Xavier G.M., et al., "A Performance Isolation Analysis of Disk-Intensive Workloads on Container-Based Clouds," 23rd Euromicro International Conference on Parallel, Distributed, and Network-Based Processing, 2015, 8 pages.

Zhao N., et al., "Simulation-Based Optimization for Storage Allocation Problem of Outbound Containers in Automated Container Terminals", Mathematical Problems in Engineering: 548762 (14), 2015, 4 pages.

* cited by examiner

SYSTEMS AND METHODS FOR MOVING NETWORK CONTAINERS IN A COMPUTER NETWORK

CROSS REFERENCE TO RELATED APPLICATIONS

The present application is a Continuation of U.S. patent application Ser. No. 17/490,715, filed Sep. 30, 2021, now U.S. Pat. No. 11,546,294 issued Jan. 3, 2023, which is a Continuation of U.S. patent application Ser. No. 15/639,883, filed Jun. 30, 2017, now U.S. Pat. No. 11,146,530 issued Oct. 12, 2021, which claims priority to and the benefit of the U.S. Provisional Patent Application No. 62/361,971, filed Jul. 13, 2016, all of which are hereby incorporated by reference in their entirety.

TECHNICAL FIELD

The disclosure generally relates to networks, and more specifically to assigning an addressing mechanism to containers located within a data center node which containers maintain as containers are moved from node to node.

BACKGROUND

Conventional network architecture includes numerous nodes. Each node hosts multiple containers. Containers provide services requested by other computing devices over a network. In order for a containers to processes requests for services efficiently and avoid node overload or underutilization, containers may also be moved from node to node.

In conventional networks, each node may be assigned a block of Internet Protocol (IP) addresses. In this case, containers that execute within the node are assigned one of the IP addresses from the block and may be accessed using the assigned IP address. In this type of a network, when a container is moved to a second node with its own block of IP addresses, the IP address of the container changes because the container is assigned one of the IP addresses from the block of the second node.

In another conventional network, multiple containers hosted by the node may be assigned an IP address of the node. In this way, network traffic that is received at the node or is transmitted from the node includes the IP address of the node, even though the traffic may originate from or be received by different containers within the node. In this network too, when a container is moved to a second node, the IP address of the container changes to the IP address of the second node.

As illustrated by examples above, the IP address that is used by a container is not preserved by the container when the container is transferred from a node to a second node.

Figure 1:
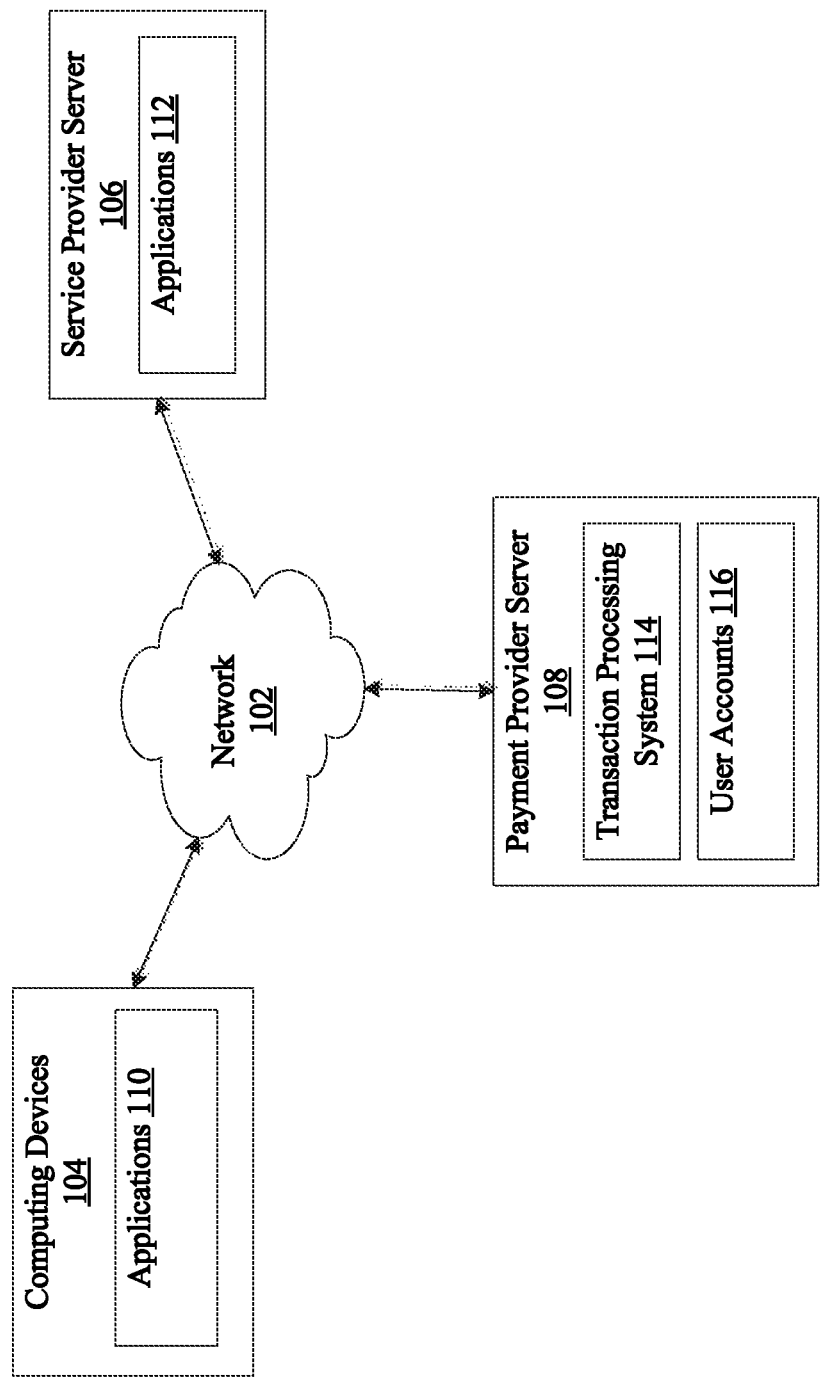
FIG. 1 is a block diagram of a system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

Various components that are accessible to network 102 may be computing devices 104, service provider server(s) 106, and payment provider server(s) 108. Computing devices 104 may be portable and non-portable electronic devices under control of a user and configured to transmit, receive, and manipulate data from service provider server(s) 106 and payment provider server(s) 108 over network 102. Example computing devices 104 include desktop computers, laptop computers, tablets, smartphones, wearable computing devices, eyeglasses that incorporate computing devices, implantable computing devices, etc.

Computing devices 104 may include one or more applications 110. Applications 110 may be pre-installed on the computing devices 104, installed on the computing devices 104 using portable memory storage devices, such as compact disks or thumb-drives, or be downloaded to the computing devices 104 from service provider server(s) 106. Applications 110 may be executed on the computing devices 104 and receive instructions and data from a user, from service provider server(s) 106, and payment provider server(s) 108.

Example applications 110 installed on computing devices 104 may be applications that request services from one or more servers. For example, applications 110 that are payment transaction applications may be configured to transfer money world-wide, receive payments for goods and services, manage money spending, etc. Further, applications 110 may be under an ownership or control of a payment service provider, such as PAYPAL®, Inc. of San Jose, CA, USA, a telephonic service provider, a social networking service provider, and/or other service providers. Applications 110 may also be analytics applications. Analytics applications perform business logic, provide services, and measure and improve performance of services and functions of other applications that execute on computing devices 104 based on current and historical data. In another embodiment, applications 110 may be security applications for implementing client-side security features, programmatic client applications for interfacing with appropriate application programming interfaces (APIs) over network 102, communication applications, such as email, texting, voice, and instant messaging applications that allow a user to send and receive emails, calls, texts, and other notifications through network 102. In yet another embodiment, applications 110 may be location detection applications, such as a mapping, compass, and/or global positioning system (GPS) application. Further, applications 110 may be social networking applications and/or merchant applications. In yet another embodiment, applications 110 may be service applications that permit a user of computing device 104 to receive, request and/or view information for products and/or services, and also permit the user to purchase the selected products and/or services.

In an embodiment, applications 110 may utilize numerous components included in computing device 104 to display, receive input, store data, and communicate with network 102. Example components are discussed in detail in FIG. 8.

As described above, one or more service provider servers 106 is also connected to network 102. Service provider server 106 may be an application executing on a computing device that provides services to a user using applications 110 that execute on computing devices 104. Service provider server 106 may also be maintained by a service provider, such as PAYPAL®, a telephonic service provider, social networking service, and/or other service providers. In an embodiment, service provider server 106 may be located on one or more nodes of a data center, which is described below.

In an embodiment, service provider server 106 stores and executes applications 112. Applications 112 may be counterparts to applications 110 executing on computing devices 104 and may receive, process, and transmit data for user requested products and/or services transmitted from applications 110. In an embodiment, applications 112 may execute on nodes in a data center. Applications 112 may also be financial services applications configured to transfer money world-wide, receive payments for goods and services, manage money spending, etc. In an embodiment, applications 112 may also be security applications configured to implement client-side security features or programmatic client applications for interfacing with appropriate application programming interfaces (APIs) over network 102. In another embodiment, applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, when applications 110 transmit requests and/or data for different transactions to applications 112, applications 112 process these transactions. The transactions may be in a form of one or more messages that are transmitted over network 102. In a further embodiment, to process transactions on applications 112, service provider server 106 may request payment from a user using application 110 via payment provider server 108. For instance, the payment provider server 108 may receive transactions from applications 110, 112 that cause the payment provider server 108 to transfer funds of a user using application 110 to service provider associated with service provider server 106.

In an embodiment, payment provider servers 108 may be maintained by a payment provider, such as PAYPAL®. Other payment provider servers 108 may be maintained by or include a merchant, financial services provider, credit card provider, bank, and/or other payment provider, which may provide user account services and/or payment services to a user. Although payment provider servers 108 are described as separate from service provider server 106, it is understood that one or more of payment provider servers 108 may include services offered by service provider server 108 and vice versa.

Each payment provider server 108 may include one or more processing applications, such as a transaction processing system 114. Transaction processing system 114 may correspond to processes, procedures, and/or applications executable by a hardware processor. In an embodiment, transaction processing system 114 may also be located in a data center and be configured to receive information from one or more applications 110, 112 executing on computing devices 104 and/or service provider server 106 for processing and completion of financial transactions. Financial transactions may include financial information corresponding to user debit/credit card information, checking account information, a user account (e.g., payment account with a payment provider server 108), or other payment information. Transaction processing system 114 may complete the financial transaction for the purchase request by providing payment to application 112 executing on service provider server 106. In various embodiments, transaction processing system 114 may provide transaction histories, including receipts, to computing device 104 in order to provide proof of purchase for an item and/or service.

Payment provider server 108 may also include user accounts 116. Each user account 116 may be established by one or more users using application 110 with payment provider server 108 to facilitate payment for goods and/or services offered by applications 112. User accounts 116 may include user information, such as name, address, birthdate, payment/funding information, travel information, additional user financial information, and/or other desired user data. In a further embodiment, user accounts 116 may be stored in a database or memory described in detail in FIG. 8.

Figure 2:
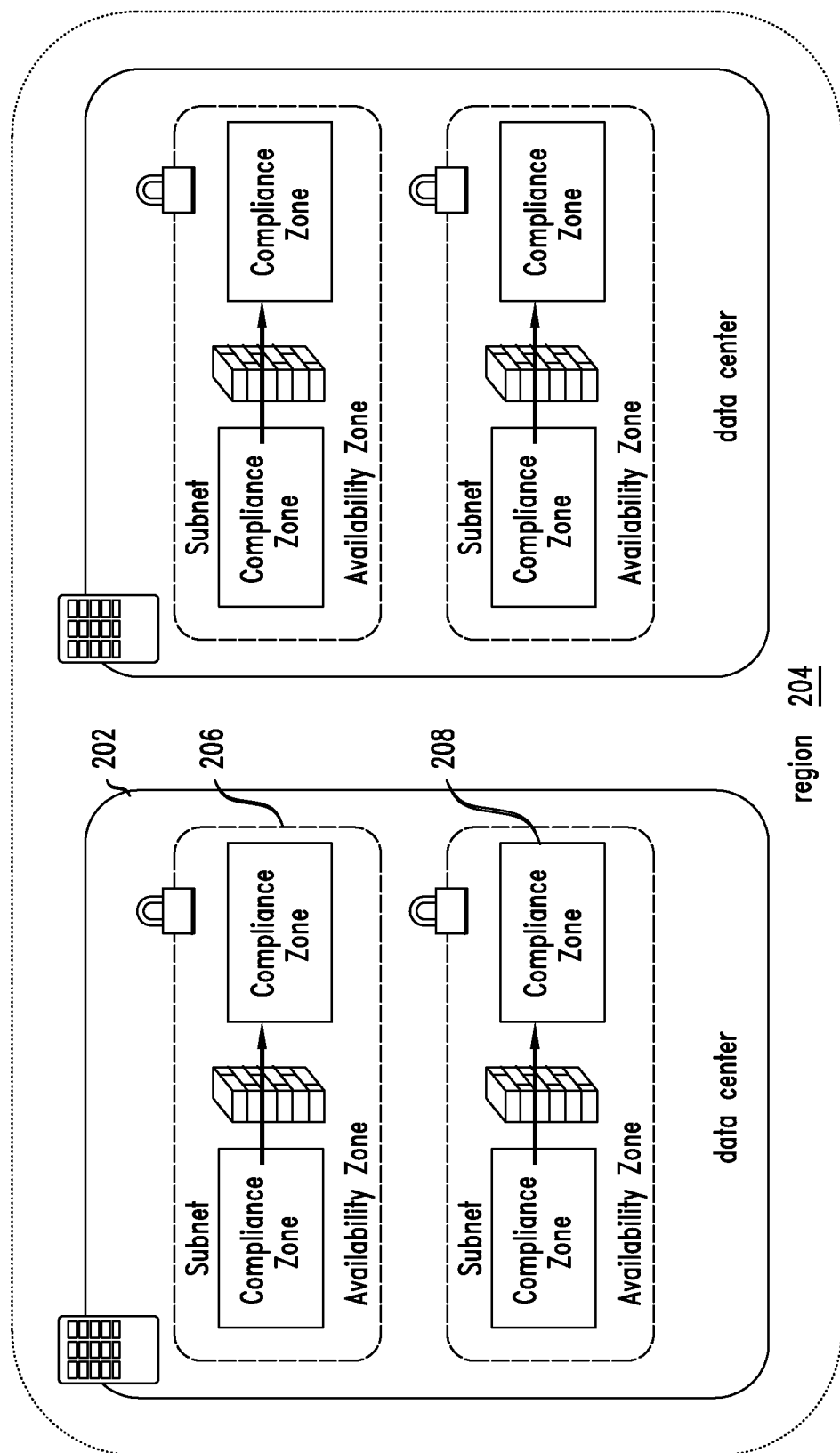
FIG. 2 is a block diagram of data centers, where embodiments can be implemented.

In an embodiment, servers, such as service provider server 106 or payment provider server 108, and the corresponding applications 112, 114 may be hosted in one or more data centers. FIG. 2 is a block diagram 200 of data centers, where embodiments can be implemented. A data center, such as data center 202 may be a facility that hosts multiple nodes, switches, etc., mounted on multiple racks. The nodes are physical computer(s) that host servers that provide services via applications, such as applications 112, 114, discussed in FIG. 1. Further, multiple data centers 202 may reside in one or more geographical regions, such as region 204 shown in FIG. 2.

In an embodiment, data centers 202 may further be divided into availability zones 206. Availability zones 206 are isolated locations within data centers 202 from which services provided by the applications may originate and operate. In an embodiment, availability zones 206 for particular services may be selected based on multiple criteria, such as proximity to customers, legal compliance enforced within regions 204 where data centers are located, available resources, latency criteria, etc. The services within availability zone 206 may execute on multiple nodes that are also located within the availability zone 206. In an embodiment, there may be multiple availability zones 206 within data center 202.

Availability zone 206 may be subdivided into one or more compliance zones 208, according to an embodiment. Compliance zone 208 may be a security zone that includes a logical network boundary behind a firewall 210. In an embodiment, network traffic that enters compliance zone 208 may be contained within the logical network boundary of the compliance zone 208, unless firewall 210 permits the network traffic to travel outside of the compliance zone 208. A firewall 210 may be a network security system which monitors incoming and outgoing traffic based on a set of predetermined rules. For example, firewall 210 may determine whether network traffic can travel between multiple compliance zones 208.

As discussed above, availability zone 206 includes multiple nodes that host various applications. In an embodiment, these applications may be included in one or more containers. These containers may also be moved from node to node in order to avoid host overutilization and/or underutilization. In an embodiment, each container may be associated with a unique internet protocol (IP) address. And, unlike conventional systems where the IP address of a container changes when the container is moved from node to node, the containers described in the embodiments herein maintain the IP addresses assigned to the containers when the containers are moved from node to node.

Figure 3:
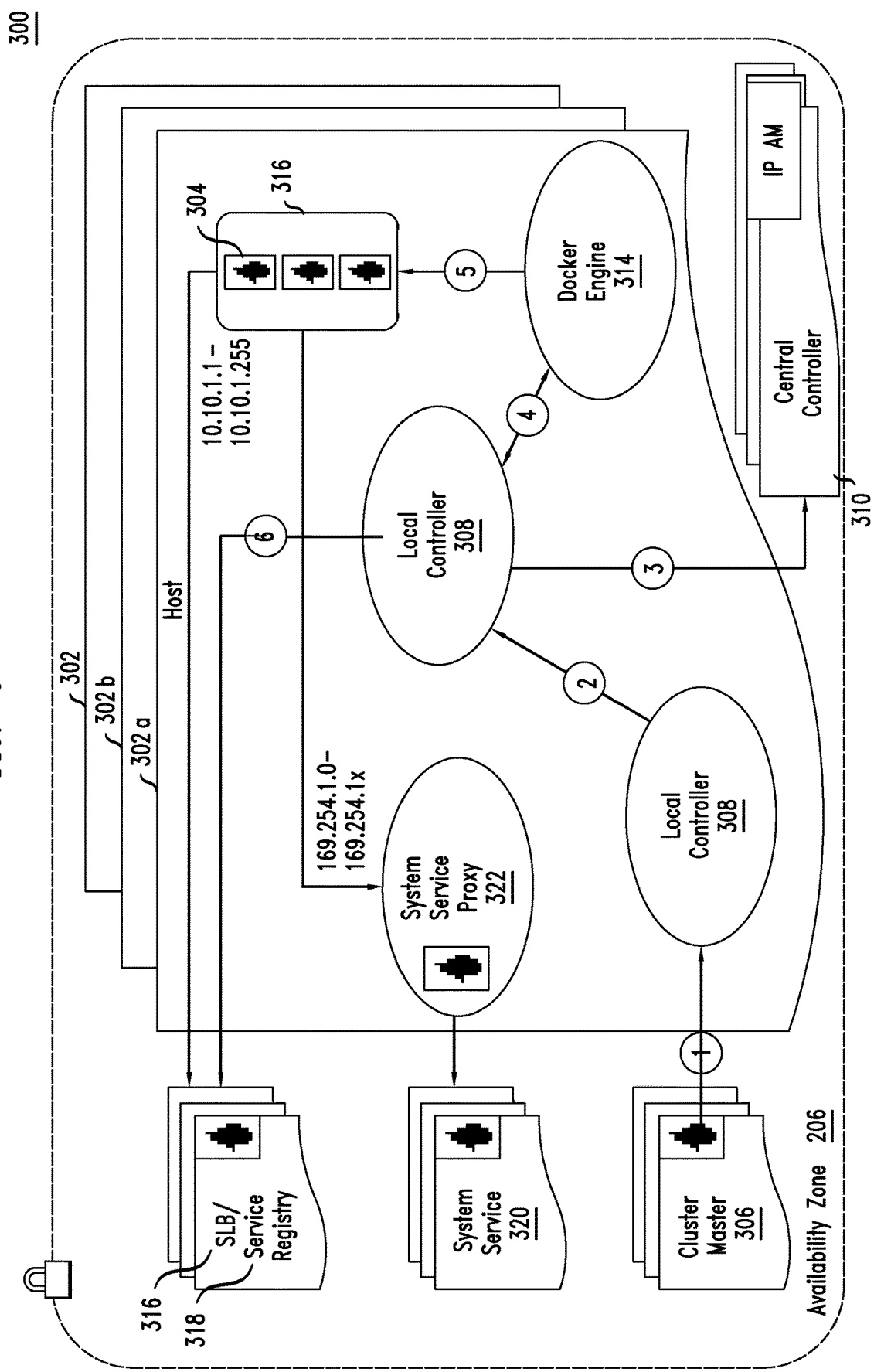
FIG. 3 is a block diagram of an availability zone in a data center, according to an embodiment.

FIG. 3 is a block diagram 300 of an availability zone in a data center, according to an embodiment. As described above, availability zone 206 includes multiple nodes 302. Nodes 302 may also be referred to as hosts, as the terms "node" and "host" are synonymous and are used interchangeably throughout the specification. Each node 302 includes one or more containers 304. In an embodiment, there may be hundreds of containers 304 hosted on each node 302.

In an embodiment, containers 304 within the availability zone 206 may be assigned an IP address. Once assigned, containers 304 maintain the IP address when containers are transferred between different nodes 302, such as nodes 302a-b within the availability zone 206.

In an embodiment, containers 304 may include one or more applications that provide one or more services requested by computing device 104 connected to network 102. Example applications may be applications 112, 114 described in FIG. 1. In an embodiment, applications within containers 304 receive network traffic which includes requests for services and generate network traffic in response to the requested services. In a further embodiment, the network traffic may be transmitted to and from the applications using IP addresses assigned to containers 304 that host the applications.

In an embodiment, each container 304 may be a virtual host that hosts the applications.

As illustrated in FIG. 3, each node 302 may also include a local controller 308, according to an embodiment. The local controller 308 controls and/or monitors containers 304 that are included in node 302. For example, the local controller 308 may use an IP address management (IPAM) technology to monitor and manage the IP addresses within node 304. In an embodiment, local controller 308 may assign IP addresses to containers 304 hosted on node 302. In another embodiment, local controller 308 may request for central controller 310, described below, to assign the IP address to containers 304.

In an embodiment, availability zone 206 includes a central controller 310. The central controller 310 communicates with, controls, and/or provides instructions to local controller 308 instantiated on each node 302. In an embodiment, central controller 310 may ensure that containers 304 hosted on each node 302 maintain the IP addresses assigned to the containers 304 when containers 304 are transferred between nodes 302, such as from, for example, node 302a to node 302b.

In an embodiment, the IP address that local controller 308 or central controller 310 assigns to container 304 is unique to container 304. In a further embodiment, the IP address assigned to container 304 may be different from an IP address that may be assigned to node 302. Further, the IP address assigned to container 304 may be visible to other nodes 302 and other devices connected to network 102. In this way, network traffic may be received by and transmitted from container 304 using container's IP address just like the traffic may be transmitted to and received from node 302.

In an embodiment, central controller 310 may also include IPAM technology which allows central controller 310 to synchronize the IP addresses assigned to various containers 304 with local controllers 308 and to monitor IP addresses assigned to multiple containers 304 within availability zone 206.

In an embodiment, central controller 310 preserves an IP address of container 304 when container 304 moves between different nodes 302, such as from node 302a to node 302b using a label, which is described below.

In an embodiment, availability zone 206 also includes a cluster master 306 (also referred to as Mesos Master in FIG. 3). Cluster master 306 monitors nodes 302 located in the availability zone 206 and determines resource availability, utilization, underutilization, and overutilization of each node 302. In an embodiment, cluster master 306 deploys one or more applications to execute on nodes 302 in one or more availability zones 206 using predetermined criteria. Example criteria may be a number of instances of an application that may execute to balance the network traffic, a number of ports the application is using, etc. In a further embodiment, cluster master 306 may scan various nodes 302 and containers 304 and identify node 302 and container 304 for each instance of the application. For example, when the predetermined criteria specifies for cluster master 306 to deploy ten instances of an application, the cluster master 306 may identify ten nodes 302 that include available resources, such as memory and CPU to host ten instances of the application and installs the ten instances of the application on the available nodes 302, one instance per node 302. In a further embodiment, when application is installed on node 302, the application may be incorporated into a new container 304 or be included into an already existing container 304.

In an embodiment, cluster master 306 may also issue instructions that move containers 304 between nodes 302, such as from node 302a to node 302b. Some reasons to move containers 304 between nodes are to minimize or reduce node overutilization, decrease service latency, etc.

In an embodiment, cluster master 306 may receive instructions from local controller 308 to rebalance the load on node 302 or container 304. For example, local controller 308 may measure traffic throughput or error rates that occur when traffic travels to node 302 or container 304. If the traffic throughput or error rates are above a preconfigured or configurable threshold, the local controller 308 may determine that node 302 or container 304 experiences traffic congestion and may issue instructions to cluster manager 306 to rebalance the load on node 302 or container 304. In an embodiment, to rebalance the load, cluster master 306 may move containers between nodes 302, as discussed above, and thus alleviate traffic that is received by node 302. In another embodiment, cluster master 306 may institute another container 304 on a different node that can execute the same application or provide the same services as the container 304 that experiences traffic congestion.

In an embodiment, node 302 includes a docker engine 314. Docker engine 314 generates one or more pods 316. Pod 316 may be a logical structure that includes or provides access to one or more containers 304. Although FIG. 3 illustrates several containers 304 within pod 316, implementation is not limited to this embodiment, and pod 316 may provide access to a single container 304

In an embodiment, the local controller 308 within node 302 may assign an IP address or a range of IP addresses to containers 304 within pod 316. As shown in FIG. 3, the exemplary range of IP addresses may be 10.10.1.1-10.10.1.255. In another embodiment, local controller 308 may also assign an IP address to pod 316. In this case, containers 304 within pod 316 may share an IP address.

In a further embodiment, control plane may also move the one or more IP addresses from one pod 316 to another pod 316 when, for example, container 304 is moved from one pod 316 to another pod 316. In yet a further embodiment, control plane also tracks the IP addresses that are assigned to pods 316 and IP addresses assigned to containers 304 within pod 316 which are subsequently moved to a different pod 316.

In order for containers 304 to maintain the same IP address as containers 304 are moved between nodes 302, network 102 and containers 304 may have several requirements. For example, container 304 may be a first class citizen of network 102. This means that the container 304 may be accessed by other components in network 102, via for example, the IP address of the container 304. In another embodiment, local controller 308 may assign an IP address to container 304 on a per container 304 or on a per pod 316 basis. In a further embodiment, a container interface of container 304 may be assigned a routable IP address and a link-local secondary IP address. A routable IP address may be an address that can be accessed by other components of network 102, while a link-local IP address may be an IP address that may be used by one of segments in network 102, such as within node 302, within availability zone 206, or within compliance zone 208. Further the link-local IP address may be a unique address within the segment of network 102, and may not be accessed by components outside of the network segment.

In an embodiment, the container to container communications within the availability zone 206 may have low latency, such as less than 100 microseconds.

In an embodiment, each node 302 may support up to 100 containers 304, though the implementation is not limited to this embodiment. Additionally, each availability zone 206 may include 50,000 to 100,000 containers 304 among nodes 302 included in the availability zone 206.

In a further embodiment, containers 304 within different compliance zones 208 may communicate through firewall 210.

In a further embodiment, containers 304 may be hosted on different nodes 302 within the availability zone 206.

In an embodiment, each availability zone 206 may include multiple load balancers (described below) that pass network traffic to different instances of applications executing on different containers 304 based on resource availability.

In a further embodiment, network may also include a distributed firewall, such as firewall between different availability zones 206 and compliance zones 208.

Figure 4:
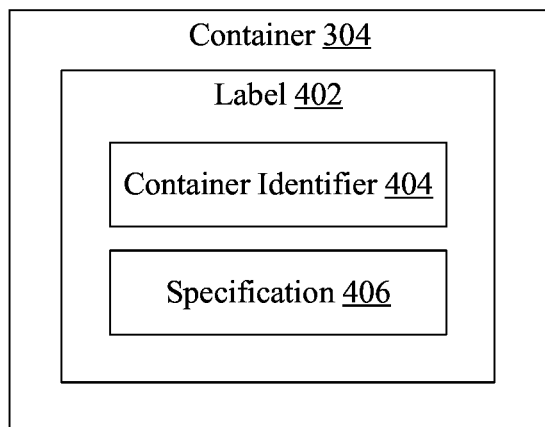
FIG. 4 is a block diagram of a label, according to an embodiment.

In an embodiment, each container 304 may include a label. FIG. 4 is a block diagram 400 of a label 402, according to an embodiment. A docker engine 314 illustrated in FIG. 3 may assign label 402 to container 304.

In an embodiment, label 402 may be unique to container 304. In a further embodiment, label 402 may include a unique container identifier 404. A container identifier 404 may be unique to an availability zone 206 and identifies container 304 within the availability zone 206.

In an embodiment, label 402 may include a specification 406. Specification 406 may identify a network, service type and service name that is associated with container 304. A network may be a logical name of a network, according to an embodiment. A logical name of a network may be assigned to a network by an operating system that executes on node 302. A service type may be a type of a service provided by container 304, according to an embodiment. Example services may include a web service, a mid-service, a zk service, a consul service, a syssvc service, etc. A service name may be a name of an application that executes within container 304.

In a further embodiment, specification 406 may also include a mobile flag. The mobile flag may be set to zero or one, or to a "true" or "false" values and indicates whether container 304 requires a mobile IP address. The mobile IP address allows the container 304 to move within multiple nodes 302 in availability zone 206, or within nodes in data center 202.

In yet a further embodiment, the container identifier 404 may be included in a specification 406.

Below, is an exemplary embodiment of a specification 406 that is included in container label 402:

Network=<network name>:service type=<type of service>:service name =<service name>:mobile=<true/false>:id=<uuid>

In an embodiment, each field in label 402 may also be passed to docker engine 314 and stored in docker engine 314. In an embodiment, docker engine 314 may store the fields from label 402 as a docker label. In yet a further embodiment, label 402 may be used to query local controller 308 or central controller 310 for an IP address assigned to container 304.

In an embodiment, local controller 308 may be synchronized with docker engine 314. During synchronization, local controller 308 determines whether each container 304 that operates on node 302 is associated with label 402. If container 304 is not running with label 402, the local controller 308 may perform repairs. Example repairs may include releasing the binding of container 304 from the central controller 310. During synchronization, local controller 308 may also determine whether docker engine 314 is running container 304 for which local controller 308 does not have label 402. In this case, local controller 308 may perform repairs by killing or terminating container 304.

Going back to FIG. 3, in an embodiment, availability zone 206 also includes one or more load balancers 316 and one or more service registries 318. Load balancers 316 may be software load balancers which receive network traffic over network 102 and direct the network traffic to one or more containers 304, as discussed in detail in FIG. 6. Service registry 318 may be a registry that stores IP addresses for service endpoints. Example addresses may be IP addresses of computing devices 104 described in FIG. 1 which request services over network 104.

In an embodiment, availability zone 206 may include multiple system services 320. System services 320 may be servers that provide a system service to one or more nodes 302. Example system services may include logging, such as logging of new containers 304 being created, monitoring of network traffic within node 302, monitoring number of containers 304 within node 302 and/or availability zone 206, monitoring node utilization, monitoring user domain access, etc.

In an embodiment, local controllers 308 of each node 302 and central controller 310 together form a control plane for availability zone 206. The control plane assigns IP addresses to containers 304, ensures containers 304 maintain the IP address when the control plane moves containers 304 between multiple nodes 302, tracks containers 304 on different nodes 302, ensures that multiple instances of the same container 304 are not assigned the same IP address, provides for data recovery when central controller 310 or one or more local controller 308 shuts down and/or restarts, and provides anomaly detection when duplicate IP addresses are assigned to different containers 304.

In an embodiment, control plane may limit the number of containers 304 that can be created on node 302. To limit the number of containers 304, control plane may reject requests for IP addresses from cluster master 306.

Figure 5:
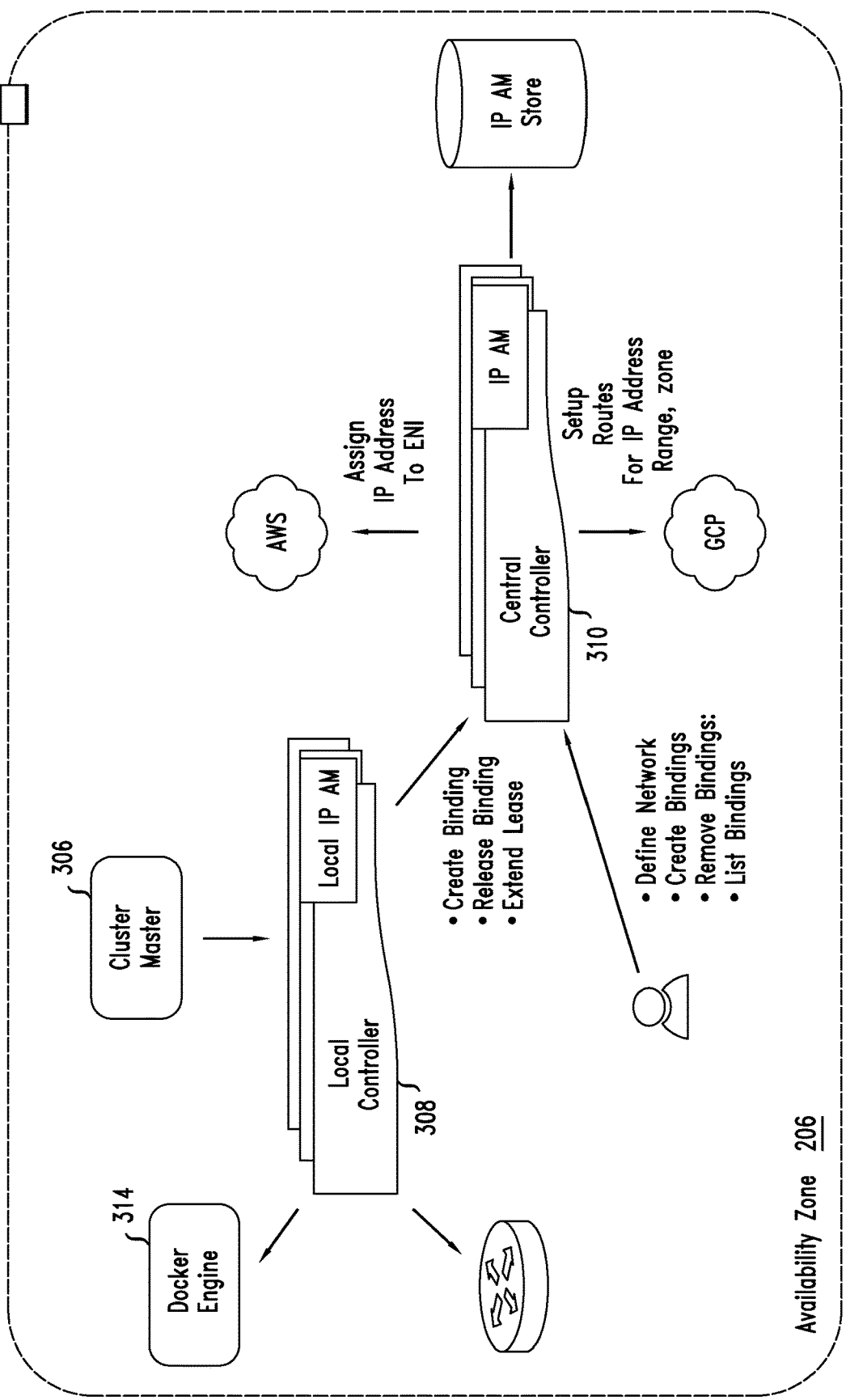
FIG. 5 is a block diagram of a control plane, according to an embodiment.

In a further embodiment, the control plane ensures that the container information on local controllers 308 and central controller 310 remains synchronized. FIG. 5 is a block diagram 500 of a control plane, according to an embodiment.

As described above, local controller 308 assigns IP addresses to containers 304 within node 302. In order for the control plane within availability zone 206 to track IP addresses assigned to containers 304 by multiple local controllers 308, the local controller 308 on each node 302 transmits the labels 402 and the corresponding IP addresses assigned to containers 304 to central controller 310. In a further embodiment, local controller 308 may transmit labels 402 and IP addresses each time a new label is generated or changed, at predefined time intervals, etc.

In an embodiment, local controllers 308 and central controller 310 are synchronized. This means the labels and IP addresses stored on central controller 310 match the labels and the IP addresses stored on local controller 308 of node 302. To ensure the central controller 310 and local controllers 308 are synchronized, each local controller 308 may generate a heartbeat. Each local controller 308 may then transmit the heartbeat to the central controller 310 every preconfigured number of seconds, such as every 20 seconds. In an alternative embodiment, central controller 310 may generate the heartbeat and transmit the heartbeat to one or more local controllers 308.

In an embodiment, a heartbeat may be or may include a value. In a further embodiment, the value may be based on the IP addresses of containers 304 that are associated with node 302 that hosts the local controller 308. In yet a further embodiment, the value may be a hash of the IP addresses of containers that are associated with node 302.

In an embodiment, one or more local controllers 308 and central controller 310 may store IP addresses in one or more data structures, such as tree structures. In this case, local controller 308 may store IP addresses of containers 304 of node 302 in a tree structure. The central controller 310 may also store IP addresses in tree structures, such that, for example, each tree structure may store IP addresses associated with a particular local controller 308. In another example, central controller 310 may store a single tree structure that may include multiple sub-trees, where each sub-tree stores IP addresses from a particular local controller 308.

In an embodiment, prior to transmitting a heartbeat, local controller 308 may retrieve the IP addresses from the tree structure and use the IP addresses to generate a hash. The hash may be a single value. The local controller 308 may then transmit the hash as a heartbeat or part of the heartbeat to the corresponding central controller 310 at predefined intervals, such as every 20 seconds. The central controller 310 may then retrieve the IP addresses in its tree or sub-tree structure that stores the IP addresses of the local controller 308 and generate a hash from the retrieved IP addresses. Next, the central controller 310 may compare the hash generated by the local controller 308 against the hash generated by the central controller 310, and determine whether the two hash values match. If the value of the hash generated by the local controller 308 matches the value generated by the central controller 310, then the IP addresses stored on the local controller 308 and the central controller 310 are synchronized. If not, then central controller 310 begins a repair process and transmits the IP addresses of containers 304 associated with the local controller 308 to the local controller 308. In another embodiment, central controller 310 may retransmit IP addresses that changed since the previous heartbeat that determined that the local controller 308 and the central controller 310 have been synchronized.

Figure 8:
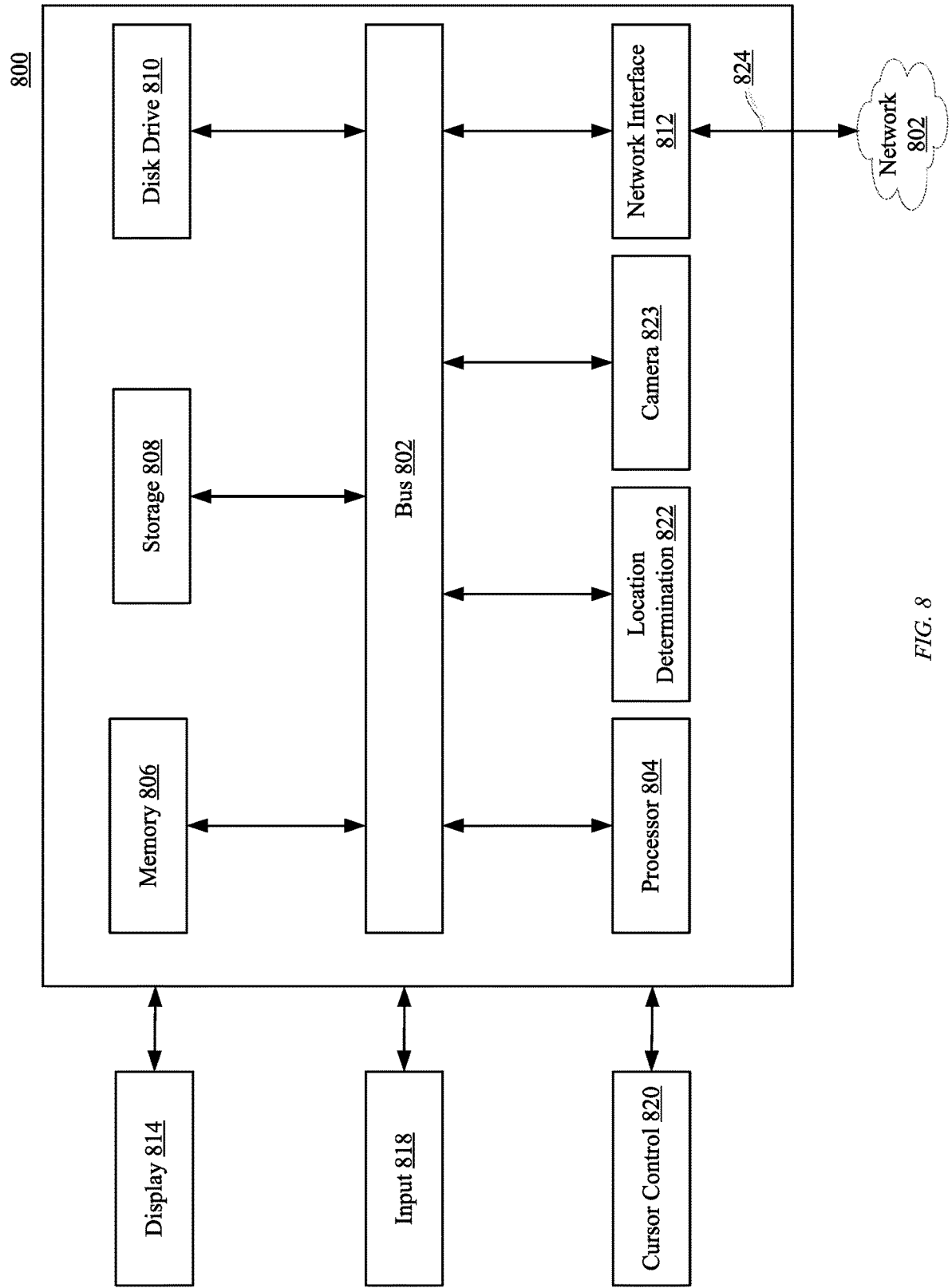
FIG. 8 is a block diagram of a computer system suitable for implementing one or more components in FIGS. 1-7, according to an embodiment.

In an embodiment, central controller 310 may be coupled to a database 502, such as IPAM store shown in FIG. 5, or another memory described in FIG. 8. The database 502 may store labels 402 associated with containers 304. As discussed above, each label 402 is associated with the IP address for the corresponding container 304.

In an embodiment, central controller 310 may use labels 402 stored in database 502 when one of containers 304 is being moved from a first node in nodes 302 to a second node in nodes 302. During the move, the local controller 302 on the first node powers down and deletes container 304, and the local controller 308 on the second node instantiates an instance of the container 304 deleted on the first node. The local controller 308 on the second node then requests for the central controller 310 to assign an IP address for the label 402 associated with container 304 deleted from the first node. The central controller 310 queries database 502 for the label 402 associated with container 304 to determine if the label 402 is associated with the container 304 on another node, such as the first node. The central controller 310 then queries the local controller 308 of the first node to determine whether the local controller 308 of the first node still requires the label 402. If container 304 on the first node has been powered down, the local controller 308 of the first node indicates to the central controller 310 that the label 402 is no longer required. In this case, central controller 310 then assigns the label 402 to the local controller 308 of the second node.

In an embodiment, the central controller 310 may crash or be powered down or otherwise lose power or functionality. In this case, when the central controller 310 restarts, central controller 310 uses database 502 to retrieve labels 402 and use the labels 402 to determine which containers 304 are instantiated on which nodes 302. In an embodiment, central controller 310 may use labels to transmit messages to each local controller 308 of node 302 and verify with local controllers 308 that containers 304 are instantiated on node 302 as indicated by labels 402. In an embodiment, if there is a mismatch between the labels 402 stored in database 502 and labels 402 stored in local controller 308, then local controller 308 may update the labels 402 stored in the database 502 with labels 402 from the local controller 308. In another embodiment, central controller 310 may query each local controller 308 for the IP addresses and labels associated with each local controller 308. Once the central controller 310 receives the IP addresses from the local controllers 308, the central controller 310 may rebuild the tree structure of the IP addresses associated with the multiple local controllers 308.

In yet another embodiment, availability zone 206 may include multiple central controllers (not shown). Multiple central controllers may operate in a master-slave configuration. In a master-slave configuration, multiple central controllers may generate or receive IP addresses from the same set of local controllers 308. In this way, multiple central controllers may load balance the requests from multiple local controllers 308.

In another embodiment, multiple central controllers may determine or elect which central controller 310 is the master central controller. Once determined or elected, local controllers 308 may identify the master central controller from multiple central controllers. In an embodiment, the master central controller may include a flag that indicates the central controller 310 is the master central controller. In another embodiment, the master central controller may transmit a message to the local controllers 308 where the message indicates that the central controller 310 is the master central controller.

Figure 6:
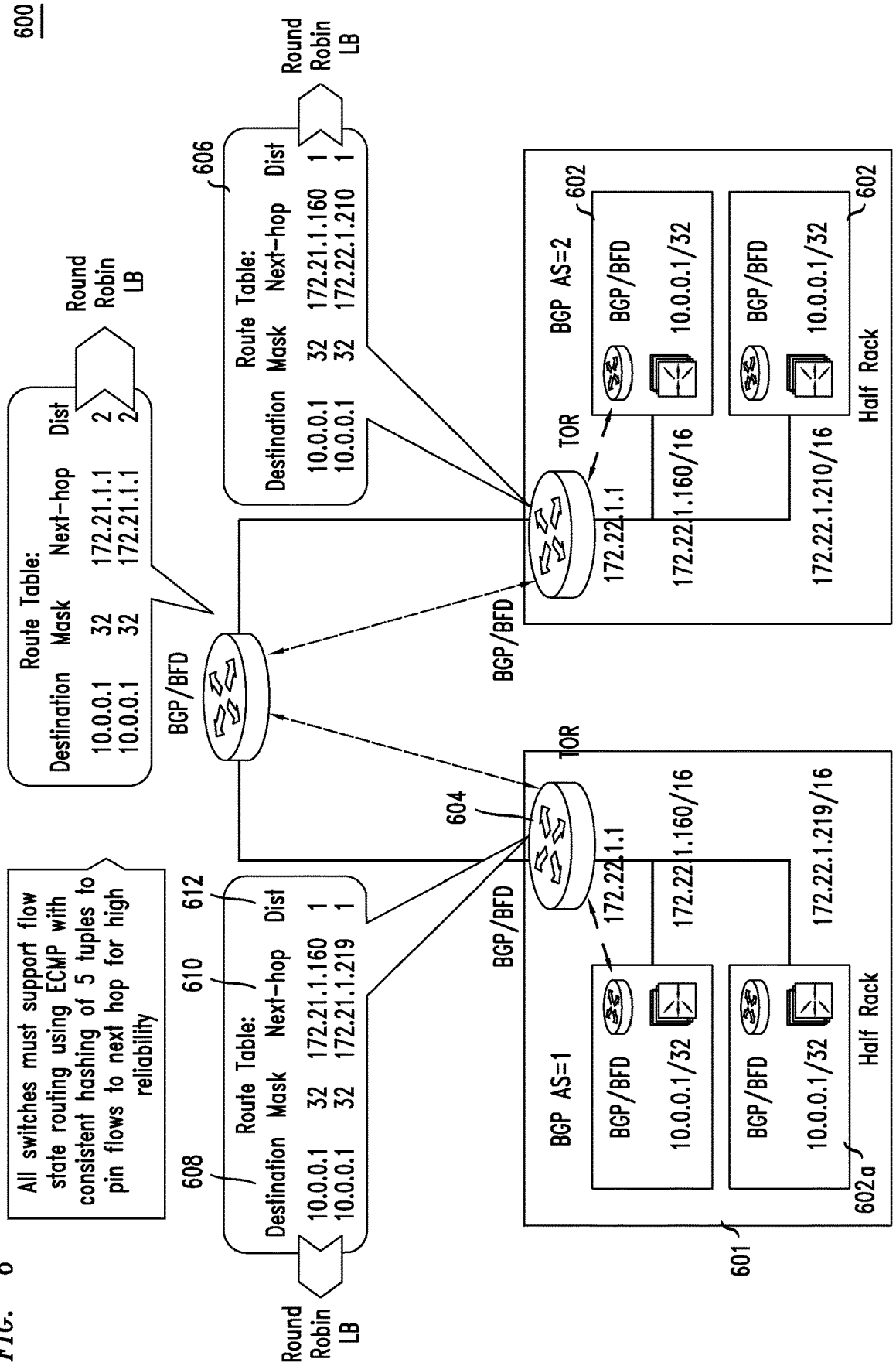
FIG. 6 is a block diagram of data center racks that include load balancers, according to an embodiment.

As described above, data center 102 includes nodes 302 that host applications that provide access to multiple services. There typically may be multiple instances of the same application that provides the same service. The multiple instances of the application ensure that a single instance of an application executing on node 302 is not overloaded with multiple requests for a service provided by the application. To ensure that requests are evenly distributed among multiple instances of the application, data center 102 may include one or more load balancers. FIG. 6 is a block diagram 600 of data center racks including load balancers, according to an embodiment. As shown in FIG. 6, data centers racks or half racks 601 include multiple load balancers 602. In an embodiment, one or more load balancers 602 may be software load balancers. One or more load balancers 602 receive network traffic from network 102 and direct the network traffic to one or more endpoints, such as containers 304 and applications that execute inside containers 304. However, typically, the computing device that requests a service, such as computing device 104 is not aware of the IP addresses of the multiple applications or containers 304 that host the applications. Instead, computing device 104 directs network traffic (which includes the requests) to a single IP address, which may be the IP address of one or more load balancers 602. Load balancers 602 may then direct the requests to container 304 that includes one of the instances of the application which provides the service.

In an embodiment, load balancers 602 can also process BGP. BGP, also referred to as a border gateway protocol, is an exterior gateway protocol designed to exchange routing and reachability information among different components of network 102. In an embodiment, load balancer 602 may inform a switch, such as a top-of-rack (TOR) switch 604, which also processes BGP, that applications which execute on one or more nodes 302 may be reached using one or more IP addresses. In an embodiment, load balancers 602 that are included in the same rack or half rack have the same MAC address but different node addresses.

In an embodiment, TOR switch 604 builds a route table 606. Route table 606 includes destination IP addresses 608 of load balancers 602, next-hop IP addresses 610, and a distance 612. Next-hop IP address 610 is an IP address of a switch, node 302, load balancer 602, etc., which is the next destination for the packets that comprise network traffic. Distance 612 is a number of network hops from TOR switch 604 to load balancer 602 associated with destination IP address 608. In an embodiment where multiple load balancers 602 execute on the same data center rack or half rack 601, load balancers 602 may be equidistant from TOR switch 604, as shown by distance equal to one in route table 606. In the case, when multiple load balancers 602 are equidistant from TOR switch 604, TOR switch 604 may transmit network traffic to one of load balancers 602 using a round-robin algorithm. In this way, when there are multiple instances of load balancers 602 on multiple racks or half racks 601, the traffic may be evenly distributed among load balancers 602.

In an embodiment, one of load balancers 602, such as load balancer 602*a* may shut down. In this case, TOR switch 604 may detect that a heartbeat was not transmitted by load balancer 602*a*. When TOR switch 604 fails to detect a heartbeat, TOR switch 604 may wait for a preconfigured number of seconds before determining that load balancer 602*a* has shut down. In an alternative embodiments, load balancers 602 and TOR switch 604 may also include a bidirectional forwarding detection (BFD) protocol. The BFD protocol is a network protocol that may be used to detect faults, such as shut downs, in a network. In this case, when load balancers 602 are enabled with the BFD, TOR switch 604 may detect that load balancer 602*a* has shut down within microseconds, such as within 300 microseconds, in one embodiment.

Figure 7:
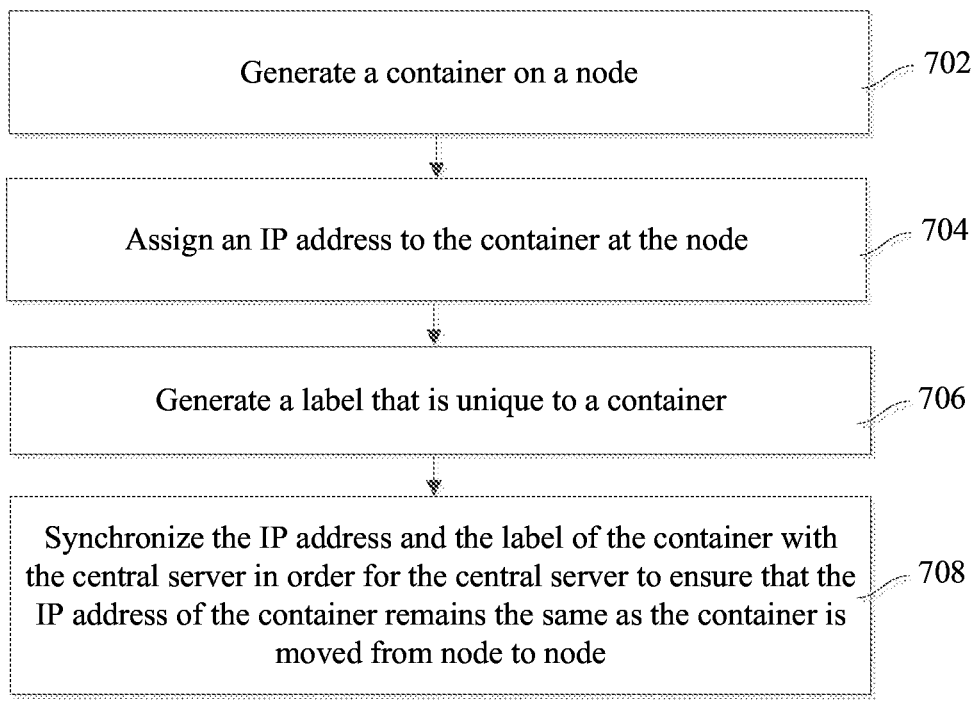
FIG. 7 is a flowchart of a method for generating a container with an Internet Protocol address, according to an embodiment.

FIG. 7 is a flowchart of a method 700 for generating a container with an IP address, according to an embodiment. Method 700 may be performed using hardware and/or software components described in FIGS. 1-6. Note that one or more of the operations may be deleted, combined, or performed in a different order as appropriate. Further, additional operations may be performed at various stages of the method.

At operation 702, a container is generated. For example, node 302 generates container 304. As discussed above, container 304 may include an application that includes a service provided over network 102. In another example, container 304 may be generated or included in pod 316.

At operation 704, an IP address is assigned to a container. For example, a local controller 308 executing on node 302 alone, or in combination with central controller 310 assigns an IP address to container 304.

At operation 706, a label for a container is generated. For example, docker engine 314 generates label 402 which is associated with container 304. The label includes container identifier 404 which is unique to container 304 and specification 406, as described above.

At operation 708, the label and the IP address of a container are synchronized with the central server. For example, the IP address assigned to container 304 in operation 704 and/or the label that is generated for container 304 in operation 706 are transmitted to central controller 310. As discussed above, central controller 310 may track container 304 when container 304 is moved between multiple nodes 302 (such as between nodes 302a and 302b), and may use label 402 to ensure that the IP address of container 304 remains the same before and after the move.

Referring now to FIG. 8 an embodiment of a computer system 800 suitable for implementing, the systems and methods described in FIGS. 1-7 is illustrated.

In accordance with various embodiments of the disclosure, computer system 800, such as a computer and/or a server, includes a bus 802 or other communication mechanism for communicating information, which interconnects subsystems and components, such as a processing component 804 (e.g., processor, micro-controller, digital signal processor (DSP), graphics processing unit (GPU), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), a location determination component 822 (e.g., a Global Positioning System (GPS) device as illustrated, a cell tower triangulation device, and/or a variety of other location determination devices known in the art), and/or a camera component 823. In one implementation, disk drive component 810 may comprise a database having one or more disk drive components.

In accordance with embodiments of the disclosure, computer system 800 performs specific operations by processor 804 executing one or more sequences of instructions contained in memory component 806, such as described herein with respect to the mobile communications devices, mobile devices, and/or servers. Such instructions may be read into system memory component 806 from another computer readable medium, such as static storage component 808 or disk drive component 810. In other embodiments, hard-wired circuitry may be used in place of or in combination with software instructions to implement the disclosure.

Logic may be encoded in a computer readable medium, which may refer to any medium that participates in providing instructions to processor 804 for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component 810, volatile media includes dynamic memory, such as system memory component 806, and transmission media includes coaxial cables, copper wire, and fiber optics, including wires that comprise bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by computer system 800. In various other embodiments of the disclosure, a plurality of the computer systems 800 coupled by a communication link 824 to network 102 (e.g., such as a LAN, WLAN, PTSN, and/or various other wired or wireless networks, including telecommunications, mobile, and cellular phone networks) may perform instruction sequences to practice the disclosure in coordination with one another.

Computer system 800 may transmit and receive messages, data, information and instructions, including one or more programs (i.e., application code) through communication link 824 and network interface component 812. Network interface component 812 may include an antenna, either separate or integrated, to enable transmission and reception via communication link 824. Received program code may be executed by processor 804 as received and/or stored in disk drive component 810 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A computer system, comprising:
    a processor; and
    a non-transitory computer-readable medium having stored thereon instructions executable to cause the computer system to perform operations comprising:
        generating, at a control plane, a container for a first node in a plurality of nodes, wherein the container is operable to execute at least one application on the first node;
        generating a label that includes a container identifier and a specification for the container, wherein the container identifier is unique to the container and the specification indicates at least one network characteristic associated with the container;

assigning, at the control plane, an Internet Protocol (IP) address to the container;

storing the label and the IP address of the container within the control plane and the first node, wherein the control plane is configured to store a plurality of labels for a plurality of containers executing on the plurality of nodes; and moving, using the control plane, the container from the first node to a second node in the plurality of nodes while preserving the IP address of the container assigned at the first node via the label, wherein the moving further comprises:

causing an instance of the container to be generated for execution on the second node;

assigning the label and the IP address to the instance of the container generated for execution on the second node once the first node indicates that the container is powered down at the first node;

removing the label and the IP address from the first node; and storing the label and the IP address at the second node.

2. The computer system of claim 1, wherein the IP address of the container is different from an IP address of the first node and an IP address of the second node.

3. The computer system of claim 1, wherein the control plane includes at least a first controller of the first node and a second controller of the second node.

4. The computer system of claim 3, wherein the control plane includes a third controller that is external to the first node and the second node.

5. The computer system of claim 4, wherein the storing further comprises:

storing the label and the IP address at the first controller of the first node; and synchronizing the label and the IP address with the third controller.

6. The computer system of claim 5, wherein the synchronizing further comprises:

generating a value associated with IP addresses of containers at the first node, wherein the IP addresses include the IP address of the container;

generating a heartbeat at the first node;

incorporating the value into the heartbeat; and transmitting the value to the third controller, wherein the third controller matches the value to a value of a subset of IP address stored at the third controller that are associated with the first node.

7. The computer system of claim 1, further comprising:

generating, at the control plane, a plurality of tree structures including a first tree structure and a second tree structure;

storing, at the first tree structure, a first plurality of IP addresses associated with the first node; and storing, at the second tree structure, a second plurality of IP addresses associated with the second node.

8. A non-transitory computer-readable medium having stored thereon instructions that are executable by a computer system to cause the computer system to perform operations comprising:

generating a container for a first node in a plurality of nodes, wherein the container is operable to execute at least one application on the first node;

generating a label that includes a container identifier and a specification for the container, wherein the label is associated with an Internet Protocol (IP) address of the container and the specification identifies one or more characteristics associated with the container, wherein the one or more characteristics correspond to a name of an application executing on the container;

storing the label and the IP address of the container within a central data structure and at the first node, wherein the central data structure is configured to store a plurality of labels for a plurality of containers executing on the plurality of nodes, and wherein the first node is configured to store a plurality of labels from a plurality of containers executing on the first node; and moving the container from the first node to a second node in the plurality of nodes while preserving the label with the IP address of the container assigned at the first node, wherein the moving further comprises:

causing an instance of the container to be generated for execution on the second node, wherein the instance of the container includes the label of the container from the first node and once the first node indicates that the container is removed from the first node.

9. The non-transitory computer-readable medium of claim 8, wherein the at least one application provides a network-based computer service via the IP address of the container.

10. The non-transitory computer-readable medium of claim 9, wherein the network-based computer service comprises an electronic payment transaction service configured to respond to electronic purchase requests from a plurality of end user devices.

11. The non-transitory computer-readable medium of claim 8, wherein the computer system comprises a plurality of computer server devices linked via one or more computer networks, and wherein the computer system is configured to provide computer application services to a plurality of customers.

12. The non-transitory computer-readable medium of claim 8, wherein the first node and the second node are configured to provide multiple network-based computer application services to a plurality of customers via the Internet.

13. The non-transitory computer-readable medium of claim 8, further comprising:

determining that the plurality of labels and IP addresses of the plurality of containers stored at the first node are synchronized with the plurality of labels and IP addresses of the plurality of containers stored at the central data structure, wherein the determining further comprises:

receiving, at the central data structure a heartbeat, wherein the heartbeat includes a first value based on the IP addresses of the plurality of containers stored at the first node;

generating a second value based on the IP addresses of the plurality of containers of the first node that are stored in the central data structure; and comparing the first value to the second value.

14. The non-transitory computer-readable medium of claim 8, wherein the storing further comprises:

storing the plurality of labels and the IP addresses of the plurality of containers of the first node in a tree structure associated with the first node, wherein the tree structure is included in the central data structure.

15. A method, comprising:

generating a container for a first node in a plurality of nodes, wherein the plurality of nodes are in a computer system;

generating a label that includes a unique container identifier and a specification for the container, wherein the label is associated with an Internet Protocol (IP)

address of the container and the specification identifies at least one network characteristic associated with the container;

storing the label of the container within a control plane and the first node, wherein the control plane is configured to store a plurality of labels for a plurality of containers executing on the plurality of nodes; and moving the container from the first node to a second node in the plurality of nodes while preserving the IP address of the container assigned to the first node, wherein the moving further comprises:

causing an instance of the container to be generated for execution on the second node;

assigning the label and the IP address to the instance of the container generated for execution on the second node subsequent to the control plane removing the container from the first node, wherein the first node indicates that the container is removed from the first node;

removing the label from the first node; and storing the label at the second node.

16. The method of claim 15, further comprising:

receiving a first data request for at least one application from a user device external to the computer system;

servicing the first data request using the container at the first node; and subsequent to moving the container while preserving the IP address of the container, receiving and servicing at the second node, a second data request for the at least one application.

17. The method of claim 15, wherein the IP address of the container is different from an IP address of the first node and an IP address of the second node.

18. The method of claim 15, further comprising:

generating, at the control plane, a plurality of tree structures, one tree structure for one node in the plurality of nodes; and storing the IP address of the container assigned to the first node within a tree structure in the plurality of tree structures corresponding to the first node.

19. The method of claim 15, wherein the specification further comprises one or more characteristics, wherein the one or more characteristics correspond to a service provided by the container.

20. The method of claim 15, wherein the specification further comprises a mobile flag set to a state indicating that the container is movable between the first node and the second node.

* * * * *